(12) United States Patent
Amino et al.

(10) Patent No.: US 7,652,096 B2
(45) Date of Patent: Jan. 26, 2010

(54) RUBBER COMPOSITION FOR TIRE TREAD

(75) Inventors: Naoya Amino, Hiratsuka (JP); Yoshihisa Inoue, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 53 days.

(21) Appl. No.: 10/495,485

(22) PCT Filed: Dec. 3, 2003

(86) PCT No.: PCT/JP03/15488

§ 371 (c)(1),
(2), (4) Date: May 13, 2004

(87) PCT Pub. No.: WO2004/052984

PCT Pub. Date: Jun. 24, 2004

(65) Prior Publication Data

US 2005/0020760 A1   Jan. 27, 2005

(30) Foreign Application Priority Data

Dec. 9, 2002   (JP) ............................. 2002-356904
Jun. 10, 2003  (JP) ............................. 2003-165116

(51) Int. Cl.
*C08K 3/04* (2006.01)

(52) U.S. Cl. .................. 524/495; 524/496; 524/571; 524/575

(58) Field of Classification Search .......... 524/495, 524/496, 571, 575
See application file for complete search history.

(56) References Cited

U.S. PATENT DOCUMENTS

| 4,154,277 A | * | 5/1979 | Sato et al. ............... 152/209.1 |
| 4,478,973 A | | 10/1984 | Misono et al. |
| 5,382,621 A | * | 1/1995 | Laube ......................... 524/496 |

FOREIGN PATENT DOCUMENTS

| JP | 62096542 A | 5/1987 |
| JP | 06-212025 A | 8/1994 |
| JP | 06-212025 A1 | 8/1994 |
| JP | 08-505427 A1 | 6/1996 |
| JP | 08-183883 A | 7/1996 |
| JP | 08-183883 A1 | 7/1996 |
| JP | 2001-040143 A1 | 2/2001 |
| JP | 2002-338734 A1 | 11/2002 |
| WO | WO-94/17134 A1 | 8/1994 |

OTHER PUBLICATIONS

International Search Report for PCT/JP03/15488 mailed on Jan. 27, 2004.
Supplementary European Search Report for Application No. PCT/JP0315488 issued Nov. 14, 2007.

* cited by examiner

*Primary Examiner*—Peter D Mulcahy
(74) *Attorney, Agent, or Firm*—Connolly Bove Lodge & Hutz LLP

(57) ABSTRACT

A rubber composition for a tire tread including 100 parts by weight of a diene-based rubber and 5 to 150 parts by weight of carbon black having a nitrogen adsorption specific area $N_2SA$ ($m^2/g$) of 80 to 150 and satisfying a relationship between a TINT (%) and dibutyl phthalate absorption DBPA (ml/100 g) of TINT (%)>1.4 DBPA (ml/100 g) and capable of increasing the frictional force without impairing the hysteresis loss.

6 Claims, No Drawings

RUBBER COMPOSITION FOR TIRE TREAD

TECHNICAL FIELD

The present invention relates to a rubber composition for a tire tread, more specifically, it relates to a rubber composition for a tire tread capable of increasing the frictional force, without substantially impairing the hysteresis loss.

BACKGROUND ART

As rubbers for a tire tread, rubbers having a high frictional force have been sought from the viewpoint of safety. On the other hand, a tire having a small rolling resistance, that is, rubbers having a small hysteresis loss at the time of tire rolling have been sought from the viewpoint of the environment and health. To achieve both of these performances, the technology for compounding silica is known (for example, see *Journal of the Adhesion Society of Japan*, Vol. 37, No. 5 (2001), pp. 21 to 26). As the reason why silica exhibits such a characteristic, the fact that a silica-containing rubber has a low modulus of elasticity at the low strain region may be mentioned. However, since silica has to be chemically bonded with rubber using a silane coupling agent, the reaction between the silica and the silane coupling agent has to be controlled. In particular, there is a problem that restrictions arise in processing when compounding a large amount of silica.

DISCLOSURE OF INVENTION

Accordingly, the object of the present invention is to provide a rubber composition for a tire tread capable of increasing the frictional force, without substantially lowering the hysteresis loss.

In accordance with the present invention, there is provided a rubber composition for a tire tread comprising 100 parts by weight of a diene-based rubber and 5 to 150 parts by weight of carbon black having a nitrogen adsorption specific area $N_2SA$ ($m^2/g$) of 80 to 150 and satisfying a relationship between a tinting strength (vs. ITRB) (i.e., TINT) (%) and dibutyl phthalate absorption DBPA (ml/100 g) of TINT (%)>1.4 DBPA (ml/100 g).

In accordance with the present invention, there is also provided a rubber composition for a tire tread comprising 100 parts by weight of a diene-based rubber having an average glass transition temperature Tg in the range of −50° C. to −10° C., 5 to 150 parts by weight of carbon black having a nitrogen adsorption specific area $N_2SA$ ($m^2/g$) of 80 to 150 and a dibutyl phthalate absorption DBPA (ml/100 g) in the range of 30 to 80 and 0 to 145 parts by weight of any other optional filler.

BEST MODE FOR CARRYING OUT THE INVENTION

In the present invention, the nitrogen adsorption specific area $N_2SA$ ($m^2/g$) means the value measured using a Model 2300 automatic specific surface area measurement instrument according to the method of JIS K6217-2, the tinting strength (vs. ITRB) (i.e., TINT) (%) means the value measured under conditions of the film stretching method using a Densichron reflectometer according to the method of JIS K6217-5 and the dibutyl phthalate absorption DBPA (ml/100 g) means the value measured using an Absorptometer Model B according to the method of JIS K6217-4.

The inventors proceeded with studies on the types of carbon black compounded into the diene-based rubber and, as a result, found that, by compounding carbon black having a suitable particle size and having a higher coloring degree compared with the magnitude of the structure, it is possible to surprisingly obtain a rubber composition having a modulus of elasticity at the low strain region of about the same extent as in the case of compounding silica.

The diene-based rubber capable of blending the rubber composition for a tire tread according to the present invention includes, for example, any diene-based rubbers which can be used as a starting rubber for a tire. As representative diene-based rubbers, various types of natural rubbers (NR), various types of polyisobutylene rubbers (IR), various types of polybutadiene rubbers (BR), various types of styrene-butadiene copolymer rubbers (SBR), ethylene-propylene-diene terpolymers (EPDM), etc. may be mentioned. These rubbers may be used alone or in any mixture thereof. The diene-based rubber used in the present invention having an average glass transition temperature of preferably −50° C. to −10° C., more preferably −45° C. to −20° C. is particularly preferable from the viewpoint of improvement of the frictional force.

The rubber composition for a tire tread according to the first aspect of the present invention, as explained above, includes 5 to 150 parts by weight, particularly 10 to 140 parts by weight, of carbon black having a nitrogen adsorption specific area $N_2SA$ ($m^2/g$) of 80 to 150, preferably 82 to 140, and satisfying a relationship between a TINT (%) and dibutyl phthalate absorption DBPA (ml/100 g) of TINT (%)>1.4 DBPA (ml/100 g).

The nitrogen adsorption specific area $N_2SA$ ($m^2/g$) of the carbon black is a value representing the particle size of the carbon black and is measured according to JIS-K6217. The coloring degree TINT (%) is an important indicator for carbon black when using for, for example color ink. It shows the brightness when coating carbon black mixed together with a white pigment (measured by JIS-K6217). The darker the color, the greater the coloring power. The DBPA (ml/100 g) is a value representing the structure of the carbon black particles and is measured according to JIS-K6217.

If the particle size of the carbon black used in the present invention, that is, the value of $N_2SA$, is too small, the characteristics at break or abrasion resistance of the rubber composition obtained is insufficient, while conversely if too large, it is difficult to make the carbon black sufficiently disperse at the time of mixing with the rubber etc., and therefore, the characteristics at break or abrasion resistance become insufficient. The carbon black used in the present invention has a DBPA of preferably 30 to 80 (ml/100 g), more preferably 40 to 78 (ml/100 g). It is possible to much more increase the frictional force using this range of DBPA. Note that it is also possible to use silica together with the carbon black to an extent not causing problems in processing.

The carbon black used in the present invention has to have a TINT (%) of more than 1.4 times the value of the DBPA (ml/100 g), preferably at least 1.5 times, more preferably at least 1.6 times. As the carbon black having a large coloring degree compared with the magnitude of the structure, for example, carbon black which had been used for ink in the past may be mentioned. This carbon black differs, in surface activity, from conventional carbon black for rubber use and therefore, a tight bound rubber is not formed after blending. Further, there are little strongly constrained rubber molecules, and therefore, the modulus of elasticity at the low strain region becomes lower in the same way as in the case of compounding silica. Further, if the structure of the carbon black is small, the carbon black will become difficult to form a network in the rubber and the modulus of elasticity at the low strain region tends to be further decreased.

Explained further, the carbon black used for tire treads in the past was considered preferable if having a small particle size (i.e., large $N_2SA$) and large structure (i.e., large DBPA). This was because it was considered that such a carbon black formed a lot of tight bound rubber and exhibited a high reinforcing property. Contrary to this, the carbon black used in the present invention has a suitable particle size (i.e., $N_2SA$ of 80 to 150 $m^2/g$) and a small structure (i.e., DBPA of 30 to 80 ml/100 g) and could not be used for tire treads up to now. Further, regarding the TINT, there had been carbon black having a large DBPA and a high TINT, but carbon black having a high TINT and a small DBPA was never used for tire treads. That is, the carbon black used in the present invention was never used for tire tread applications and is completely novel for tire tread use. In this way, carbon black having a small structure had not been preferred from the viewpoint of the reinforcability, but the inventors found that, by using carbon black having a suitable particle size and high TINT, it is possible to obtain a rubber composition superior in wet performance, even compared with conventional carbon black, and sufficient for tire tread use even in terms of reinforcability.

In the second aspect of the present invention, by adding to 100 parts by weight of a diene-based rubber having a Tg of −50° C. to −10° C., preferably −45 to −20° C., carbon black having an $N_2SA$ of 80 to 150 $m^2/g$, preferably 82 to 140 $m^2/g$ and a DBPA of 30 to 80 ml/g, preferably 40 to 78 ml/100 g, it is possible to obtain the desired effect of the present invention regardless of the TINT of the carbon black. Note that the rubber composition according to the second aspect of the present invention may include, in addition to the 100 parts by weight of diene-based rubber and 5 to 150 parts by weight of the above specified carbon black, 0 to 145 parts by weight, preferably 5 to 135 parts by weight, of any optional fillers (for example, general carbon black or silica).

The rubber composition according to the present invention may have contain, in addition to the above essential ingredients, various additives generally used for tires, such as vulcanization and cross-linking agents, vulcanization and cross-linking accelerators, various types of oils, anti-aging agents, and plasticizers. The formulations may be mixed by a general method to form the compositions which may then be used for vulcanization or cross-linking. The amounts of these additives may be made the conventional general amounts, so far as the object of the prevent invention is not adversely affected. The rubber composition of the present invention is useful as a rubber composition for a tire tread having the increased frictional force, without impairing the hysteresis loss.

EXAMPLES

The present invention will now be explained further by Examples, but the scope of the present invention is, of course, not limited to these Examples.

Examples 1 to 4 and Comparative Examples 1 and 2

Preparation of Samples

Following each of the formulations shown in Table I and using a 16-liter internal Bambury mixer, the rubber and the carbon black and other compounding agents, other than the sulfur and vulcanization accelerator, were mixed for 5 minutes to obtain a master batch, then an open roll was used to mix the vulcanization accelerator and sulfur therein to obtain the rubber composition. Each rubber composition thus obtained was vulcanized in a 15×15×0.2 cm mold at a temperature of 160° C. for 30 minutes to obtain a vulcanized rubber sheet.

Next, each vulcanized rubber sheet thus obtained was measured for ΔE' (20° C.) and wet braking performance according the following methods. The results are shown in Table I.

Measurement of ΔE'

Using a viscoelasticity spectrometer made by Toyo Seiki, the storage modulus E' and the loss modulus E" were measured using dynamic strain from 0.2% to 8.2% as a variable. The modulus of elasticity $E'_0$ at a zero strain and the modulus of elasticity $E'_\infty$ at an infinite strain were found by a Cole-Cole plot (see G. Kraus, *Reinforcement of Elastomers*, Interscience Publishers, p. 81 (1965)) and the value of $E'_0 - E'_\infty$ was made ΔE'. The smaller the value of this ΔE', the better the followability of protuberance on the road surface and the more improved the grip force.

Wet Braking Test

Size 195/65R15 tires using different rubber compositions for the tread parts were fabricated and measured for a braking distance on an asphalt road surface from an initial speed of 100 km/h. The results were indexed to Comparative Example 1 as 100. The larger the figure, the shorter the braking distance and therefore the better.

TABLE I

|  | Comp. Ex. 1 | Ex. 1 | Ex. 2 | Comp. Ex. 2 | Ex. 3 | Ex. 4 |
|---|---|---|---|---|---|---|
| Formulation (parts by weight) |  |  |  |  |  |  |
| Nipol 9528R*[1] | 68.75 | 68.75 | 68.75 | 68.75 | 68.75 | 68.75 |
| Nipol 1502*[2] | 50 | 50 | 50 | 50 | 50 | 50 |
| N234*[3] | 80 | — | — | 40 | — | — |
| Nipsil AQ*[4] | — | — | — | 40 | 20 | 20 |
| RCF#44*[5] | — | 80 | — | — | 60 | — |
| RCF#45L*[6] | — | — | 80 | — | — | 60 |
| Santoflex 6PPD*[7] | 1 | 1 | 1 | 1 | 1 | 1 |
| Zinc oxide no. 3*[8] | 3 | 3 | 3 | 3 | 3 | 3 |
| Stearic acid*[9] | 1 | 1 | 1 | 1 | 1 | 1 |
| Aromatic oil*[10] | 16.25 | 16.25 | 16.25 | 16.25 | 16.25 | 16.25 |
| Santocure NS*[11] | 2 | 2 | 2 | 2 | 2 | 2 |
| Sulfur*[12] | 1.7 | 1.7 | 1.7 | 1.7 | 1.7 | 1.7 |
| Evaluated properties |  |  |  |  |  |  |
| ΔE' (20° C.) | 35.9 | 25.9 | 23.2 | 32.6 | 25.7 | 21.7 |
| Wet braking index | 100 | 108 | 106 | 105 | 110 | 107 |

Footnotes of Table I
*[1] 27.3% oil extended SBR (Tg = −35° C.) made by Nippon Zeon
*[2] SBR (Tg = −51° C.) made by Nippon Zeon
*[3] Carbon black made by Showa Cabot (see Table II)
*[4] Silica made by Nippon Silica Industrial
*[5] Carbon black made by Mitsubishi Chemical (see Table II)
*[6] Carbon black made by Mitsubishi Chemical (see Table II)
*[7] Antiaging agent made by FLEXSYS
*[8] Industrial use zinc oxide made by Seido Chemical
*[9] Stearic acid made by Nippon Oil and Fat
*[10] Aromatic oil made by Showa Shell Oil Sekiyu
*[11] Sulfenamide-based vulcanization accelerator made by FLEXSYS
*[12] Sulfur made by Tsurumi Chemical

TABLE II

|  | N234 | RCF#44 | RCF#45L |
|---|---|---|---|
| $N_2SA$ (m$^2$/g) | 112 | 99.7 | 117 |
| DBP (ml/100 g) | 121 | 76 | 54 |
| 1.4 × DBP | 169 | 106 | 76 |
| TINT (%) | 122 | 129 | 141 |

Note that the average Tg of Nipol 9528R (Tg=−35° C.) and Nipol 1502 (Tg=−51° C.) is −35×0.5+(−51×0.5)=−43° C.

INDUSTRIAL APPLICABILITY

As explained above, according to the present invention, it is possible to increase the frictional force of rubber, without causing a deterioration of the hysteresis loss, and therefore the composition is preferable for use as a rubber composition for a tire tread.

The invention claimed is:

1. A rubber composition for a tire tread comprising (i) 100 parts by weight of a diene-based rubber having an average glass transition temperature Tg of −50° C. to −10° C. and wherein said diene-based rubber is at least one member selected from the group consisting of polybutadiene rubber (BR) and styrene-butadiene copolymer rubber (SBR) and (ii) 5 to 150 parts by weight of carbon black having a nitrogen adsorption specific area $N_2SA$ (m$^2$/g) of 80 to 150 and a dibutyl phthalate absorption DBPA in the range of 30 to 80 (ml/100 g) and satisfying a relationship between a tinting strength TINT (%) and a dibutyl phthalate absorption DPBA (ml/100 g) of TINT %>1.5 DPBA (ml/100 g) and (iii) 0 to 145 parts by weight of any other optional filler.

2. A pneumatic tire using a rubber composition according to claim 1 for a tire tread.

3. A rubber composition for a tire tread, as claimed in claim 1, wherein the DBPA is in the range of 40 to 78 ml/100 g.

4. A rubber composition for a tire tread, as claimed in claim 1, wherein the average glass transition temperature Tg of said diene-based rubber is in the range of −45° C. to −20° C.

5. A rubber composition for a tire tread, as claimed in claim 4, wherein the DBPA is in the range of 40 to 78 ml/100 g.

6. A rubber composition for a tire tread, as claimed in claim 1, wherein the diene-based rubber is styrene-butadiene copolymer rubber (SBR).

* * * * *